(12) United States Patent
Matsusue

(10) Patent No.: US 11,695,142 B2
(45) Date of Patent: Jul. 4, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 341 days.

(21) Appl. No.: 17/063,839

(22) Filed: Oct. 6, 2020

(65) Prior Publication Data

US 2021/0194024 A1    Jun. 24, 2021

(30) Foreign Application Priority Data

Dec. 23, 2019 (JP) .............................. JP2019-231269

(51) Int. Cl.
*H01M 8/04746* (2016.01)
*H01M 8/04089* (2016.01)
(Continued)

(52) U.S. Cl.
CPC ... *H01M 8/04753* (2013.01); *H01M 8/04089* (2013.01); *H01M 8/04253* (2013.01); *H01M 8/04201* (2013.01); *H01M 8/04225* (2016.02); *H01M 8/04268* (2013.01); *H01M 8/04302* (2016.02); *H01M 2250/20* (2013.01)

(58) Field of Classification Search
CPC ......... H01M 8/04753; H01M 8/04089; H01M 8/04253; H01M 8/04225; H01M 8/04201; H01M 8/04097; H01M 8/04; H01M 8/04302; H01M 8/04708; H01M 8/04761; H01M 8/04164; H01M 8/04231; H01M 8/04268; H01M 8/04776; H01M 8/04388; H01M 8/04425; H01M 2008/1095
See application file for complete search history.

(56) References Cited

U.S. PATENT DOCUMENTS

2005/0064255 A1    3/2005    Blaszczyk et al.
2007/0248858 A1    10/2007   Blaszczyk et al.
(Continued)

FOREIGN PATENT DOCUMENTS

DE    102011114799 A1    4/2013
JP    S-56114287 A       9/1981
(Continued)

*Primary Examiner* — Matthew W Van Oudenaren
(74) *Attorney, Agent, or Firm* — Finnegan, Henderson, Farabow, Garrett & Dunner, LLP

(57) ABSTRACT

A fuel cell system includes: a fuel cell that includes an installation port and a discharge port for a reactant gas; a first injection device that intermittently injects the reactant gas; second and third injection devices that continuously inject the reactant gas; an ejector that includes an ejection port for the reactant gas from the first or second injection device and the discharge port; a first flow passage that connects the installation port and the ejection port; a second flow passage through which the reactant gas from the third injection device is led to the first flow passage without the ejector; and a control device that performs a warm-up operation by executing the injection of the third injection device, executes the injection of the second injection device, and executes the injection of the first injection device after completion of the warm-up operation.

6 Claims, 8 Drawing Sheets

(51) Int. Cl.
*H01M 8/04223* (2016.01)
*H01M 8/04225* (2016.01)
*H01M 8/04302* (2016.01)
*H01M 8/04082* (2016.01)

(56) References Cited

U.S. PATENT DOCUMENTS

| | | |
|---|---|---|
| 2012/0141891 A1 | 6/2012 | Kwon et al. |
| 2013/0164641 A1 | 6/2013 | Fukuda et al. |
| 2013/0309590 A1 | 11/2013 | Furusawa et al. |
| 2016/0141685 A1 | 5/2016 | Toida et al. |
| 2018/0038317 A1* | 2/2018 | Nagata ............... F02M 21/0254 |
| 2019/0305338 A1 | 10/2019 | Kato et al. |

FOREIGN PATENT DOCUMENTS

| | | |
|---|---|---|
| JP | 2002-151116 A | 5/2002 |
| JP | 2010-242508 A | 10/2010 |
| JP | 2013-134882 A | 7/2013 |
| JP | 2013-239250 A | 11/2013 |
| JP | 2013239250 | * 11/2013 |
| JP | 2019-157706 A | 9/2019 |
| JP | 2020-126729 A | 8/2020 |
| KR | 10-2016-0058000 A | 5/2016 |

* cited by examiner

COMPARATIVE EXAMPLE

“FUEL CELL SYSTEM

CROSS-REFERENCE TO RELATED APPLICATION

This application claims priority to Japanese Patent Application No. 2019-231269 filed on Dec. 23, 2019, incorporated herein by reference in its entirety.

BACKGROUND

1. Technical Field

The disclosure relates to a fuel cell system.

2. Description of Related Art

For example, when operation of a fuel cell system is stopped in a below-freezing environment, moisture generated by electric power generation can freeze to become ice near an off gas outlet port of a fuel cell stack and the ice can block the off gas outlet port. Therefore, at the time of restart of the fuel cell system, a warm-up operation for melting the ice using heat generated by electric power generation is performed in order to restrain decrease in electric power generation performance due to the block of the off gas outlet port.

However, in a fuel cell system including a cyclic path for an off gas and an ejector, hydrogen gas is supplied from a tank through the ejector to the fuel cell stack, and further the off gas is also supplied from the cyclic path through the ejector to the fuel cell stack (see Japanese Patent Application Publication No. 2013-134882, for example). Therefore, another gas (referred to as an "impurity gas" hereinafter) in the off gas remaining in the cyclic path and the ejector, for example, nitrogen gas, is mixed with the hydrogen gas, so that the concentration of the hydrogen gas decreases. Therefore, because of the block of the off gas outlet port, the fuel cell stack is filled with the impurity gas, and the supply amount of the hydrogen gas becomes insufficient, so that there is a fear that it is not possible to continue the electric power generation until the ice sufficiently melts.

SUMMARY

In response, it is possible to continue the electric power generation by continuously supplying a high-concentration hydrogen gas to the fuel cell from a linear solenoid valve connected to the tank, while bypassing the ejector. However, in the case of supplying the hydrogen gas through the path that bypasses the ejector, the hydrogen gas can reversely flow into the ejector and the supply amount of the hydrogen gas can decrease, because the pressure in the cyclic path from the off gas outlet port to the ejector is lower than the pressure in the fuel cell stack.

It is possible to restrain the reverse flow by adding another ejector (referred to as an "additional ejector" hereinafter) connected to the ejector in parallel and another linear solenoid valve (referred to as an "additional valve" hereinafter) connected to the additional ejector and supplying a small amount of hydrogen gas from the additional valve through the additional ejector. However, the hydrogen gas flowing from the additional valve does not pulsate the pressure of an anode system. Therefore, liquid water sucked into the additional ejector together with the off gas or liquid water generated by condensation of water vapor due to a low-temperature hydrogen gas is hard to be discharged from the additional ejector. Accordingly, the liquid water can remain in the additional ejector even after the warm-up operation, can freeze when the ambient temperature becomes a below-freezing temperature, and can obstruct the injection of the hydrogen gas.

The disclosure provides a fuel cell system that can easily discharge the liquid water that remains in the ejector after the warm-up operation of the fuel cell.

A fuel cell system in the disclosure includes: a fuel cell that includes an installation port and a discharge port for a reactant gas that is used for electric power generation; a first injection device that intermittently injects the reactant gas; a second injection device and a third injection device that continuously inject the reactant gas; an ejector that includes an ejection port from which the reactant gas discharged from the discharge port is ejected together with the reactant gas injected from the first injection device or the second injection device; a first flow passage that connects the installation port and the ejection port; a second flow passage through which the reactant gas injected from the third injection device is led to the first flow passage without the ejector; and a control device configured to control an injection of the first injection device, the second injection device and the third injection device, in which: the ejector includes a common third flow passage through which the reactant gas discharged from the discharge port and the reactant gas injected from the first injection device and the second injection device flow to the ejection port; and the control device is configured to perform a warm-up operation of the fuel cell by executing an injection of the third injection device, restrains a reverse flow of the reactant gas by executing an injection of the second injection device, the reverse flow being a reverse flow by which the reactant gas flows from the third injection device to the third flow passage through the second flow passage, the first flow passage and the ejection port, and executes the injection of the first injection device after completion of the warm-up operation of the fuel cell.

With the above configuration, the control device is configured to perform the warm-up operation of the fuel cell by executing the injection of the third injection device, and restrains the reverse flow of the reactant gas by which the reactant gas flows from the third injection device to the third flow passage through the second flow passage, the first flow passage and the ejection port, by executing the injection of the second injection device. Since the second injection device and the third injection device continuously inject the reactant gas, the reverse flow of the reactant gas to the ejector is restrained. Further, it is possible to perform the warm-up operation, while continuously supplying the reactant gas that does not contain an impurity gas in the ejector and that has a high concentration from the third injection device to the fuel cell.

Further, the control device may be configured to execute the injection of the first injection device after the completion of the warm-up operation of the fuel cell. The first injection device intermittently injects the reactant gas, and the fuel cell uses the reactant gas for the electric power generation. Therefore, the pressure in the ejector pulsates due to the intermittent injection of the first injection device.

Further, the ejector includes the common third flow passage through which the reactant gas discharged from the discharge port and the reactant gas injected from the first injection device and the second injection device flow to the ejection port. Therefore, liquid water generated in the third flow passage by the injection of the second injection device is discharged from the discharge port by the pulsation of the pressure due to the intermittent injection of the first injection device.

Accordingly, the fuel cell system in the disclosure can easily discharge the liquid water that remains in the ejector after the warm-up operation of the fuel cell.

In the above configuration, the control device may be configured to stop the injection of the second injection device and the third injection device after the completion of the warm-up operation of the fuel cell.

In the above configuration, the control device may be configured to stop the injection of the first injection device until the completion of the warm-up operation of the fuel cell.

In the above configuration, the control device may be configured to execute the injection of the second injection device at a flow rate depending on the temperature of the fuel cell at a time of start of the warm-up operation of the fuel cell.

In the above configuration, the ejector may include a first nozzle from which the reactant gas injected from the first injection device is injected to the third flow passage, and a second nozzle from which the reactant gas injected from the second injection device is injected to the third flow passage.

In the above configuration, the ejector may include a common third nozzle from which the reactant gas injected from the first injection device and the reactant gas injected from the second injection device are injected to the third flow passage.

In the above configuration, the control device may be configured to perform the warm-up operation of the fuel cell until the temperature of the fuel cell exceeds a freezing point.

In the above configuration, the first injection device may include an injector, and each of the second injection device and the third injection device may include a linear solenoid valve.

With the disclosure, it is possible to easily discharge the liquid water that remains in the ejector after the warm-up operation of the fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration of Fuel Cell System 100

Figure 1:
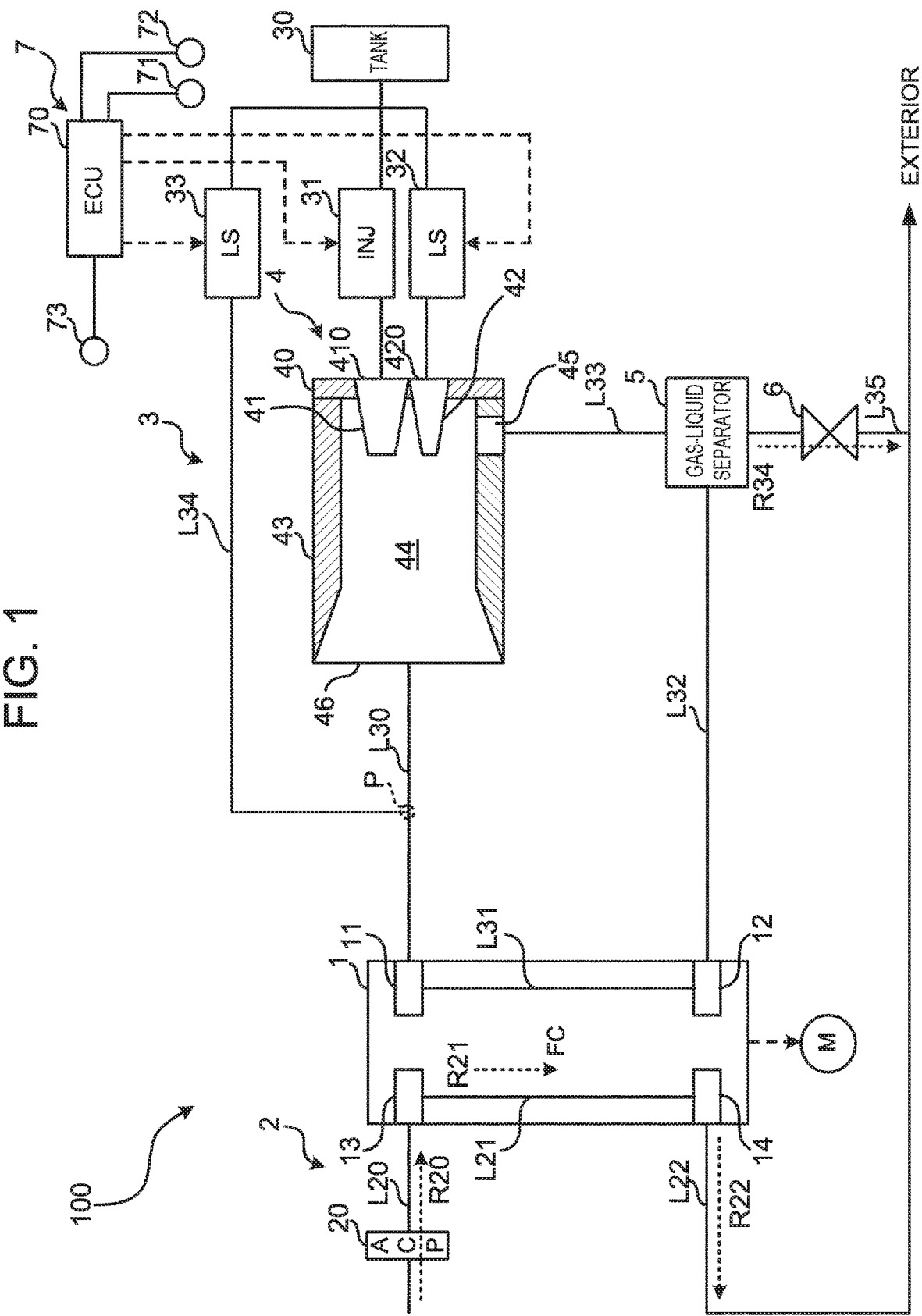
FIG. 1 is a configuration diagram showing an exemplary fuel cell system.

FIG. 1 is a configuration diagram showing an exemplary fuel cell system 100. The fuel cell system 100 is mounted on a fuel cell vehicle, for example, and includes a fuel cell (FC) 1, a motor M, a cathode system 2, an anode system 3, and a control system 7. The electric configuration of connecting the FC 1 and the motor M is not illustrated.

The FC 1 includes a laminated body constituted by a plurality of unit cells each of which has a solid polymer electrolyte. The FC 1 receives supply of a cathode gas and an anode gas, and generates electric power by a chemical reaction of the cathode gas and the anode gas. In the embodiment, air containing oxygen is used as the cathode gas, and hydrogen gas is used as the anode gas. The anode gas is an exemplary reactant gas that is used for electric power generation. The electric power generated by the FC 1 is supplied to the motor M.

The FC 1 includes an inlet port 11 and an outlet port 12 for the anode gas and an inlet port 13 and an outlet port 14 for the cathode gas. The inlet port 11 and the outlet port 12 for the anode gas are connected through an anode-gas flow passage L31, and the inlet port 13 and the outlet port 14 for the cathode gas are connected through a cathode-gas flow passage L21. Each of the anode-gas flow passage L31 and the cathode-gas flow passage L21 includes a manifold that passes through the laminated body constituted by the unit cells, grooves that are formed on separators of the unit cells, and the like. The inlet port 11 and the outlet port 12 for the anode gas are an exemplary installation port and an exemplary discharge port for the reactant gas, respectively.

The cathode system 2 supplies the air containing oxygen, as the cathode gas, to the FC 1. For example, the cathode system 2 includes a cathode supply pipe L20, a cathode discharge pipe L22, and an air compressor 20.

A downstream-side end portion of the cathode supply pipe L20 is connected to the inlet port 13 of the FC 1 for the cathode gas. The air compressor (ACP) 20 is provided on the cathode supply pipe L20. The air compressor 20 compresses the cathode gas. The cathode gas flows through the cathode supply pipe L20, and is supplied to the FC 1, as shown by an arrow R20. The cathode gas in the FC 1 flows through the cathode-gas flow passage L21 from the inlet port 13, as shown by an arrow R21, and is used for the electric power generation by the chemical reaction with the anode gas.

An upstream-side end portion of the cathode discharge pipe L22 is connected to the outlet port 14 of the FC 1 for a cathode off gas. The FC 1 discharges the cathode gas used for the electric power generation, as the cathode off gas, from the outlet port 14 to the cathode discharge pipe L22. The cathode off gas flows through the cathode discharge pipe L22, and is discharged to the exterior, as shown by an arrow R22.

The anode system 3 supplies the anode gas to the FC 1. The anode system 3 includes an anode supply pipe L30, an anode discharge pipe L32, a return pipe L33, a bypass pipe L34, a gas-liquid discharge pipe L35, a fuel tank 30, an injector (INJ) 31, an auxiliary linear solenoid valve (LS) 32, a bypass linear solenoid valve (bypass LS) 33, an ejector 4, a gas-liquid separator 5, and an anode discharge valve 6.

In the fuel tank 30, the anode gas is stored at a high pressure. The fuel tank 30 supplies the anode gas to the INJ 31, the auxiliary LS 32 and the bypass LS 33. The INJ 31 intermittently injects the anode gas. For example, at regular time intervals, the INJ 31 injects the anode gas at a predetermined flow rate. The auxiliary LS 32 and the bypass LS 33 continuously injects the anode gas. Further, the auxiliary LS 32 and the bypass LS 33 can inject the anode gas at arbitrary flow rates.

The bypass LS 33 and the auxiliary LS 32 inject the anode gas in a warm-up operation of the FC 1, and the INJ 31 injects the anode gas in a normal operation after the warm-up operation of the FC 1. The INJ 31 is an exemplary first injection device, the auxiliary LS 32 is an exemplary second injection device, and the bypass LS 33 is an exemplary third injection device.

The INJ 31 and the auxiliary LS 32 are connected to the ejector 4. The bypass LS 33 is connected to the anode supply pipe L30 through the bypass pipe L34.

FIG. 1 shows a cross section of the ejector 4 along a direction in which the anode gas flows. The ejector 4 includes a plate-like fixing part 40, a large-diameter nozzle 41, a small-diameter nozzle 42, and a diffuser 43. The material of the ejector 4 is steel use stainless (SUS), for example, but is not limited to SUS.

The fixing part 40 fixes the large-diameter nozzle 41 and the small-diameter nozzle 42. An inlet port 410 of the large-diameter nozzle 41 is connected to the INJ 31, and an inlet port 420 of the small-diameter nozzle 42 is connected to the auxiliary LS 32. The large-diameter nozzle 41 injects the anode gas from the INJ 31, from an injection port to the diffuser 43, and the small-diameter nozzle 42 injects the anode gas from the auxiliary LS 32, from an injection port to the diffuser 43. The diameter of the injection port of the large-diameter nozzle 41 is larger than the diameter of the injection port of the small-diameter nozzle 42. The large-diameter nozzle 41 is an exemplary first nozzle, and the small-diameter nozzle 42 is an exemplary second nozzle.

The diffuser 43 includes an ejector flow passage 44 through which the anode gas flows, and an outflow port 46 that is connected to the anode supply pipe L30. The anode gas injected from the large-diameter nozzle 41 and the small-diameter nozzle 42 flows through the ejector flow passage 44. The anode gas flows through the ejector flow passage 44, and is ejected from the outflow port 46 to the anode supply pipe L30.

An inflow port 45 connected to the return pipe L33 is provided on a side surface of the diffuser 43. The return pipe L33 connects the inflow port 45 and the gas-liquid separator 5. An anode off gas that flows from the gas-liquid separator 5 to the return pipe L33 is sucked from the inflow port 45 into the ejector flow passage 44, because the anode gas injected from the large-diameter nozzle 41 or the small-diameter nozzle 42 acts as a drive fluid. The anode off gas flows from the gas-liquid separator 5 into the inflow port 45.

The anode off gas flows from the inflow port 45 to the ejector flow passage 44, and is ejected from the outflow port 46 to the anode supply pipe L30, together with the anode gas. The ejector flow passage 44 is an exemplary common third flow passage through which the anode off gas and the reactant gas injected from the INJ 31 and the auxiliary LS 32 flow to the outflow port 46, and the anode off gas is an exemplary reactant gas discharged from the FC 1.

One end of the anode supply pipe L30 is connected to the outflow port 46 of the ejector 4, and the other end of the anode supply pipe L30 is connected to the inlet port 11 of the FC 1 for the anode gas. The anode supply pipe L30 is an exemplary first flow passage that connects the inlet port 11 and the inflow port 45. One end of the bypass pipe L34 extending from the bypass LS 33 is connected to the middle (see reference character P) of the anode supply pipe L30. The bypass pipe L34 is an exemplary second flow passage through which the anode gas injected from the bypass LS 33 is led to the anode supply pipe L30 without the ejector 4.

One end of the anode discharge pipe L32 is connected to the outlet port 12 of the FC 1 for the anode off gas, and the other end of the anode discharge pipe L32 is connected to the gas-liquid separator 5. The anode off gas flows through the anode discharge pipe L32 from the outlet port 12, and enters the gas-liquid separator 5.

The gas-liquid separator 5 separates liquid water from the anode off gas discharged from the outlet port 12. One end of the gas-liquid discharge pipe L35 is connected to the gas-liquid separator 5, and the other end of the gas-liquid discharge pipe L35 is connected to the cathode discharge pipe L22. The anode discharge valve 6 is provided in the gas-liquid discharge pipe L35. When the anode discharge valve 6 is opened, the liquid water and some of the anode off gas that flow out of the gas-liquid separator 5 flows to the cathode discharge pipe L22 through the gas-liquid discharge pipe L35, and is discharged to the exterior together with the cathode off gas, as shown by an arrow R34.

One end of the return pipe L33 is connected to the gas-liquid separator 5, and the other end of the return pipe L33 is connected to the inflow port 45 of the ejector 4. The anode off gas flows through the return pipe L33 from the gas-liquid separator 5, and enters the inflow port 45 of the ejector 4.

The control system 7 includes an ECU 70, an ignition switch 71, an accelerator operation amount sensor 72, and a temperature sensor 73. The ignition switch 71 gives instructions of start and stop of the fuel cell vehicle, to the ECU 70. The accelerator operation amount sensor 72 detects the operation amount of an accelerator (not illustrated) of the fuel cell vehicle, and gives information of the operation amount of the accelerator, to the ECU 70. The temperature sensor 73 detects the temperature of coolant of the FC 1, and gives information of the temperature of the coolant, to the ECU 70. The ECU 70 processes the temperature measured by the temperature sensor 73, as the temperature of the FC 1.

The ECU 70 includes a central processing unit (CPU), a read-only memory (ROM), and a random-access memory (RAM). The ECU 70 is electrically connected to the ignition switch 71, the accelerator operation amount sensor 72, the temperature sensor 73, the air compressor 20, the INJ 31, the auxiliary LS 32, the bypass LS 33, and the anode discharge valve 6. The ECU 70 controls the actuation of the air compressor 20 and the injection of the INJ 31, the auxiliary LS 32 and the bypass LS 33.

The ECU 70 starts the electric power generation of the FC 1 when the ignition switch 71 is turned on, and stops the electric power generation of the FC 1 when the ignition switch 71 is turned off. When the ignition switch 71 is turned on, the ECU 70 actuates the air compressor 20. At the start of the electric power generation of the FC 1, in the case where the temperature of the FC 1 is equal to or lower than a predetermined reference temperature TH, the ECU 70 performs the warm-up operation of the FC 1, and then performs the normal operation of the FC 1 after the temperature of the FC 1 exceeds to the predetermined reference temperature TH. During the warm-up operation, the ECU 70 promotes the heat generation and temperature rise of the FC 1, by decreasing the stoichiometric ratio of the cathode gas compared to the normal operation. Furthermore, during the warm-up operation, the ECU 70 may promote the heat generation and temperature rise, by stopping the action of an unillustrated cooling system. In the following, the supply of the anode gas during the warm-up operation and the supply of the anode gas during the normal operation will be described.

Warm-Up Operation of FC 1

Figure 2:
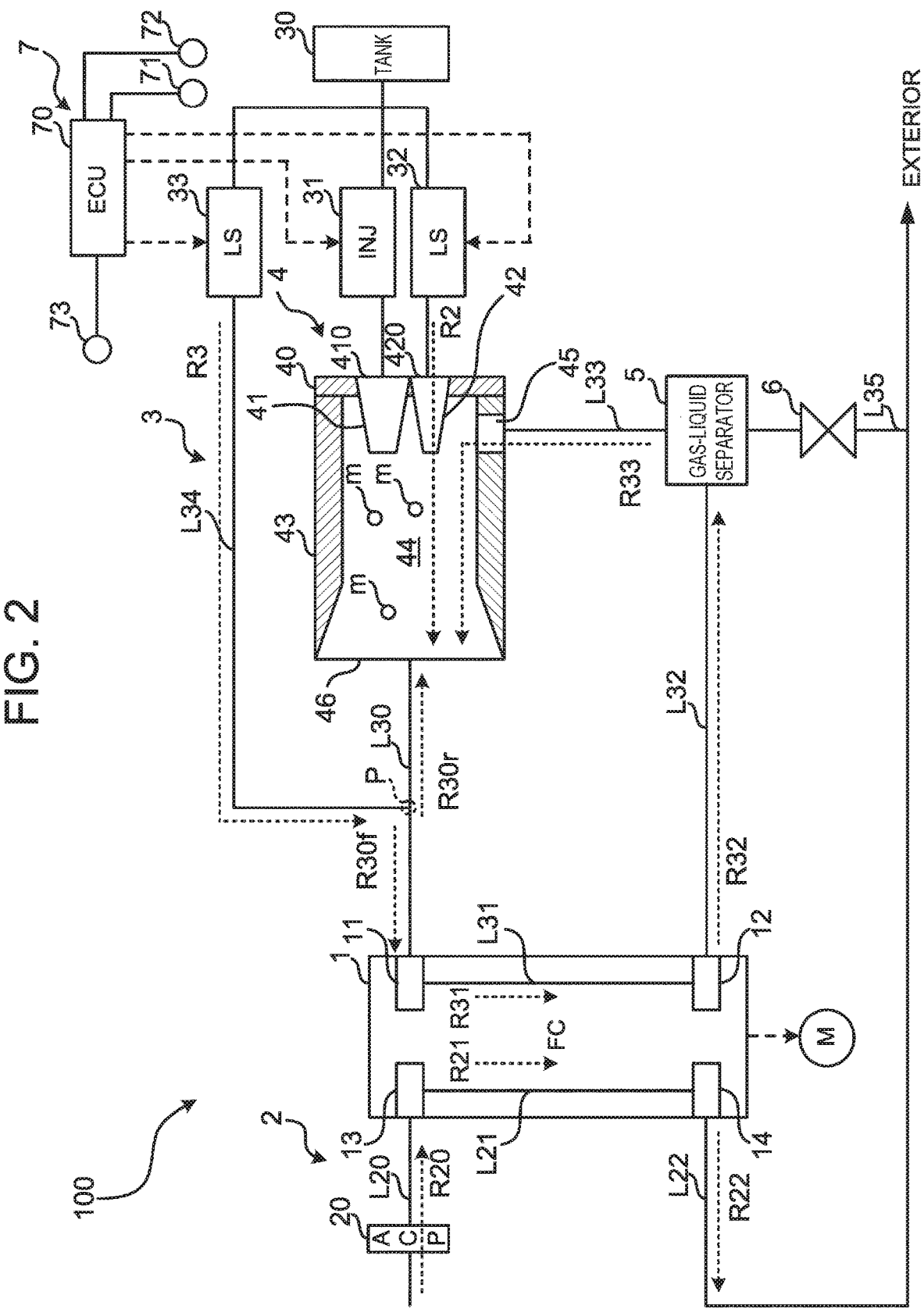
FIG. 2 is a diagram showing an exemplary flow of an anode gas and an anode off gas at the time of a warm-up operation of a fuel cell.

FIG. 2 is a diagram showing an exemplary flow of the anode gas and the anode off gas at the time of the warm-up operation of the FC 1. In FIG. 2, constituents in common with FIG. 1 are denoted by identical reference characters, and descriptions for the constituents are omitted.

The ECU 70 performs the warm-up operation of the FC 1 by executing the injection of the bypass LS 33. The anode gas injected from the bypass LS 33 is introduced into the anode supply pipe L30 without the ejector 4, as shown by an arrow R3. On this occasion, some of the anode gas injected from the bypass LS 33 reversely flows to the ejector 4 through the anode supply pipe L30, as shown by an arrow R30r. The reversely flowing anode gas flows through the bypass pipe L34 and the anode supply pipe L30, and flows from the outflow port 46 to the ejector flow passage 44.

In response, the ECU 70 causes the auxiliary LS 32 to inject the anode gas, such that the reverse flow of the anode gas from the bypass LS 33 is restrained. The anode gas injected from the auxiliary LS 32 flows through the ejector flow passage 44, and is ejected from the outflow port 46 to the anode supply pipe L30, as shown by an arrow R2.

Since the auxiliary LS 32 and the bypass LS 33 continuously inject the reactant gas, the reverse flow of the reactant gas to the ejector 4 is restrained. Further, it is possible to perform the warm-up operation, while continuously supplying the reactant gas that does not contain an impurity gas in the ejector 4 and that has a high concentration, from the bypass LS 33 to the FC 1 through the anode supply pipe L30, as shown by an arrow R30f.

For example, the ECU 70 causes the bypass LS 33 to inject the anode gas at a flow rate depending on the temperature of the temperature sensor 73. Therefore, it is possible to quickly perform the warm-up operation depending on the temperature of the FC 1.

The anode gas flows through the anode gas flow passage L31 from the inlet port 11, as shown by an arrow R31, and is used for the electric power generation by the chemical reaction with the cathode gas. The FC 1 discharges the anode gas used for the electric power generation, from the outlet port 12 to the anode discharge pipe L32 as the anode off gas. The anode off gas flows through the anode discharge pipe L32 from the outlet port 12 of the FC 1, and enters the gas-liquid separator 5, as shown by an arrow R32.

The anode off gas flows through the return pipe L33 from the gas-liquid separator 5, and flows through the ejector flow passage 44 from the inflow port 45 of the ejector flow passage 44, as shown by an arrow R33. That is, when the auxiliary LS 32 injects the anode gas, the anode off gas is sucked from the gas-liquid separator 5 into the ejector 4 through the return pipe L33. The anode off gas discharged from the FC 1 contains moisture that is generated by the electric power generation in the FC 1. Therefore, during the warm-up operation, in the ejector flow passage 44, a liquid water m that has not been separated by the gas-liquid separator 5 is generated, and a liquid water m due to condensation of water vapor is generated by cooling with the anode gas having a low temperature.

For example, when the liquid water m remains in the ejector flow passage 44, there is a fear that the liquid water freezes at a below-freezing temperature to block the ejector flow passage 44, and that the anode gas cannot be supplied to the FC 1 at a sufficient flow rate, at the time of restart of the fuel cell system 100.

Therefore, the ECU 70 discharges the liquid water remaining in the ejector flow passage 44, by executing the injection of the INJ 31 in the normal operation after the completion of the warm-up operation.

Normal Operation of FC 1

Figure 3:
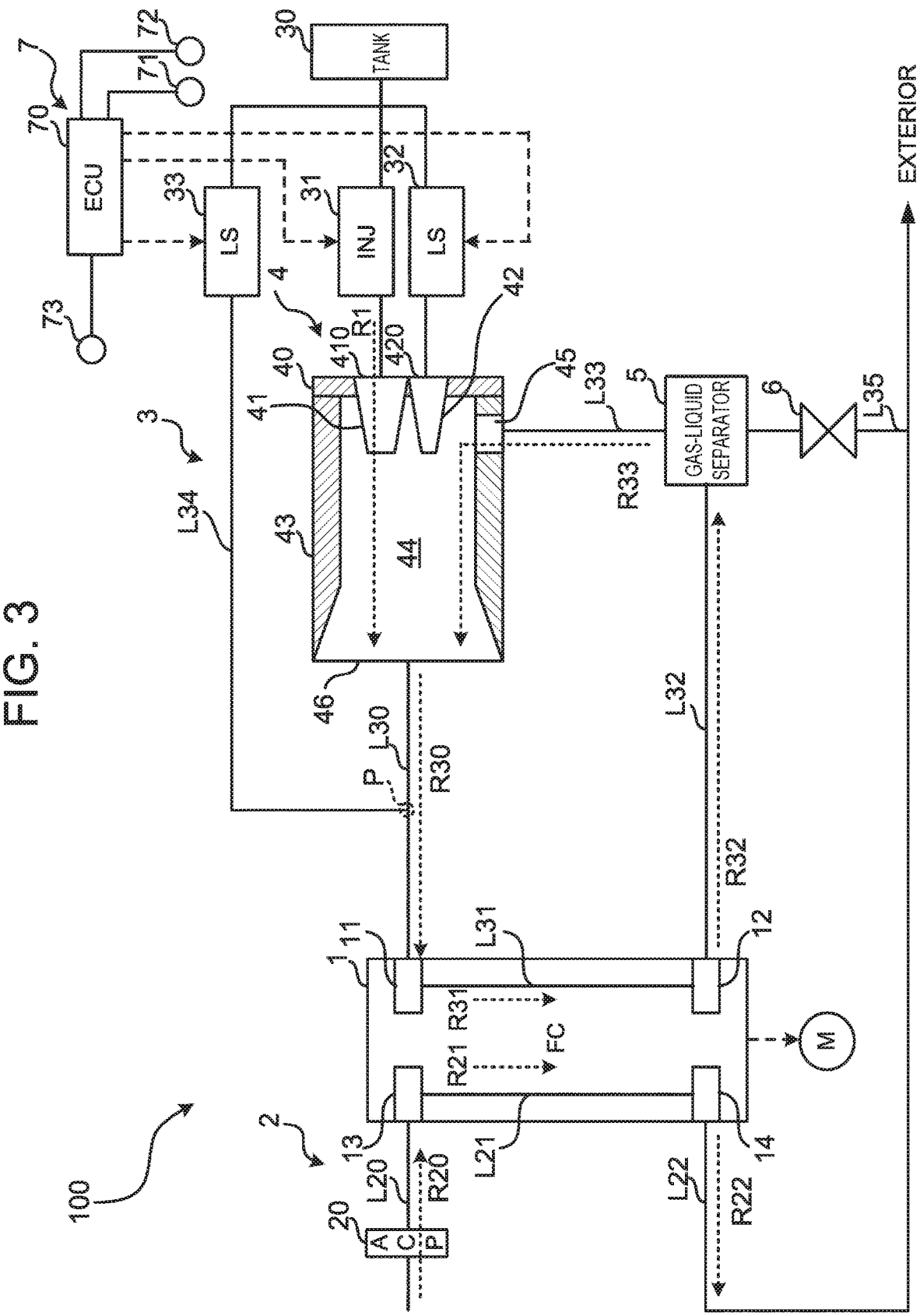
FIG. 3 is a diagram showing an exemplary flow of the anode gas and the anode off gas at the time of a normal operation of the fuel cell.

FIG. 3 is a diagram showing an exemplary flow of the anode gas and the anode off gas at the time of the normal operation of the FC 1. In FIG. 3, constituents in common with FIG. 1 are denoted by identical reference characters, and descriptions for the constituents are omitted.

After the completion of the warm-up operation of the FC 1, the ECU 70 executes the injection of the INJ 31. The anode gas injected from the INJ 31 flows through the ejector flow passage 44, and is ejected from the outflow port 46 to the anode supply pipe L30, as shown by an arrow RE Further, the anode off gas in the return pipe L33 is sucked from the inflow port 45 into the ejector flow passage 44, and is ejected from the outflow port 46 to the anode supply pipe L30.

The anode gas and the anode off gas enter the anode gas flow passage L31 of the FC 1 from the anode supply pipe L30 through the inlet port 11, as shown by an arrow R30. The anode gas and some of the anode off gas are used for the electric power generation.

The INJ 31 intermittently injects the anode gas, and the FC 1 uses the anode gas for the electric power generation. Therefore, the pressure in the ejector 4 pulsates due to the intermittent injection of the INJ 31. The anode off gas sucked from the inflow port 45, the anode gas injected from the auxiliary LS 32 and the anode gas injected from the INJ 31 flow through the ejector flow passage 44. Therefore, the liquid water m generated in the ejector flow passage 44 by the injection of the auxiliary LS 32 is discharged from the outflow port 46 by the pulsation of the pressure due to the intermittent injection of the INJ 31.

The liquid water m in the ejector flow passage 44 flows through the anode supply pipe L30, the anode gas flow passage L31 and the anode discharge pipe L32, and is retained in the gas-liquid separator 5. The liquid water in the gas-liquid separator 5 is discharged from the cathode discharge pipe L22 at the time of opening of the anode discharge valve 6.

In the normal operation of the FC 1, the ECU 70 calculates a current value that the FC 1 is required to output, for example, depending on the accelerator operation amount detected by the accelerator operation amount sensor 72. The ECU 70 gives an instruction of the flow rate of the cathode gas, to the air compressor 20, and gives an instruction of the flow rate of the anode gas, to the INJ 31.

Change in Anode Gas Flow Rate

Figure 4:
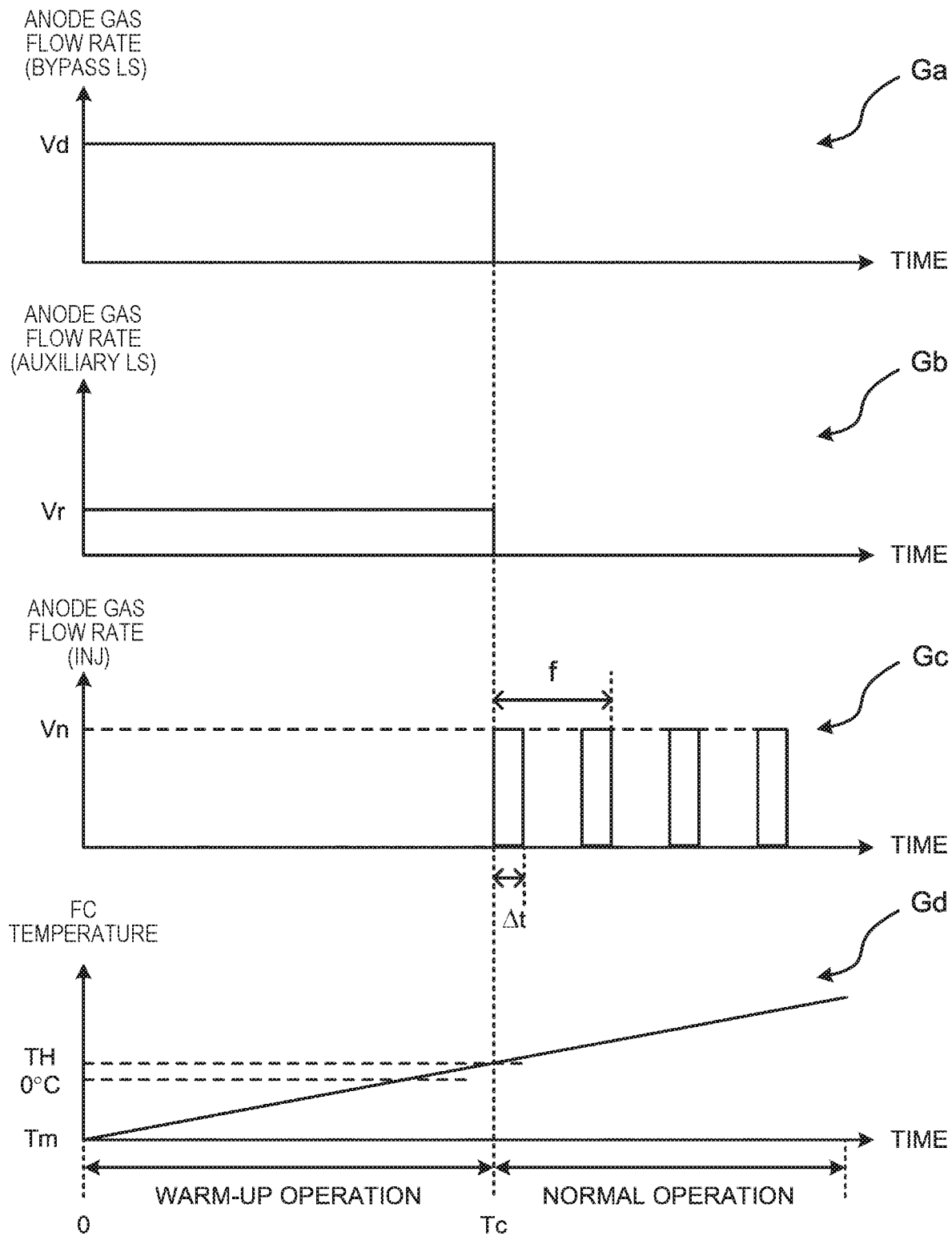
FIG. 4 is a diagram showing an exemplary temporal change in flow rates of anode gases injected from a bypass linear solenoid valve, an auxiliary linear solenoid valve and an injector.

FIG. 4 is a diagram showing an exemplary temporal change in flow rates of anode gases injected from the bypass LS 33, the auxiliary LS 32 and the INJ 31. Reference character Ga denotes an exemplary change in the anode gas flow rate of the bypass LS 33 with respect to time, reference character Gb denotes an exemplary change in the anode gas flow rate of the auxiliary LS 32 with respect to time, and reference character Gc denotes an exemplary change in the anode gas flow rate of the INJ 31 with respect to time. Further, reference character Gd denotes an exemplary change in the temperature of the FC 1 with respect to time.

The ECU 70 performs the warm-up operation of the FC 1 during a period from time 0 to time Tc, and performs the normal operation of the FC 1 after time Tc. The ECU 70 switches the operation of the FC 1 depending on the temperature detected by the temperature sensor 73. As an example, the temperature of the FC 1 rises from a temperature Tm in proportion to time, and exceeds a reference temperature TH at time Tc.

During the warm-up operation, the ECU 70 executes the injection of the bypass LS 33 at a flow rate Vd depending on the temperature Tm of the FC 1 at time 0. Thereby, the anode gas is supplied to the FC 1 at an appropriate flow rate Vd, and therefore the temperature of the FC 1 quickly rises.

Further, during the warm-up operation, the ECU 70 executes the injection of the auxiliary LS 32 at a flow rate Vr, such that the anode gas injected from the bypass LS 33 is restrained from reversely flowing to the ejector flow passage 44. The ECU 70 calculates an appropriate flow rate Vr from the flow rate Vd of the anode gas that is injected from the bypass LS 33. Based on the setting of the opening degrees of the auxiliary LS 32 and the bypass LS 33, the ECU 70 controls the anode gas flow rates.

The ECU 70 stops the injection of the INJ 31 until the completion of the warm-up operation of the FC 1. Since the INJ 31 intermittently injects the anode gas, the pressure of the anode gas pulsates, and the circulation amount of the anode off gas that is sucked from the return pipe L33 into the ejector flow passage 44 increases. When the circulation amount of the anode off gas increases, the amount of the liquid water that is generated in the ejector flow passage 44 also increases. Therefore, it is preferable that the ECU 70 stop the injection of the INJ 31, but without being limited to this, the ECU 70 may execute the injection of the INJ 31 at such a flow rate that the anode gas for restraining the reverse flow is compensated.

When the temperature of the FC 1 exceeds the reference temperature TH, the ECU 70 performs the normal operation of the FC 1 by executing the injection of the INJ 31. The reference temperature TH is equal to or higher than 0° C., which is the freezing point. That is, the ECU 70 performs the warm-up operation until the temperature of the FC 1 exceeds the freezing point. This restrains the freezing of the liquid water generated in the ejector flow passage 44 during the warm-up operation, and therefore the liquid water is more easily discharged from the ejector flow passage 44 by the injection of the INJ 31, compared to the case where there is ice.

The ECU 70 causes the INJ 31 to intermittently inject the anode gas by turning the INJ 31 on and off with a period f, for example. The ECU 70 decides an on-time Δt of the INJ 31 and the period f depending on the required current value of the FC 1. Further, a flow rate Vn of the anode gas that is injected from the INJ 31 is constant.

When the INJ 31 injects the anode gas, the amount of the anode gas in the anode system 3 temporarily rises, and thereby the pressure of the anode gas rises. However, the amount of the anode gas decreases because of the use for the electric power generation of the FC 1, and therefore the pressure of the anode gas decreases immediately after the injection. Accordingly, when the INJ 31 intermittently injects the anode gas, the pressure of the anode gas in the anode system 3 pulsates. On this occasion, the pressure in the ejector flow passage 44 also pulsates, and therefore the liquid water in the ejector flow passage 44 is easily discharged from the outflow port 46.

The INJ 31 is higher in the responsiveness to the instruction from the ECU 70, than the auxiliary LS 32 and the bypass LS 33, and therefore the liquid water can be more effectively discharged by the injection of the INJ 31.

Figure 5:
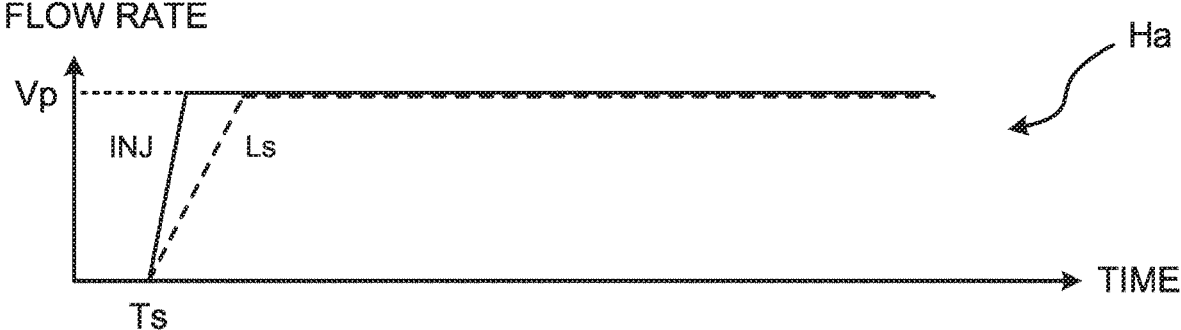
FIG. 5 is a diagram showing a result of performance comparison between an injector and a linear solenoid valve.
Figure 5:
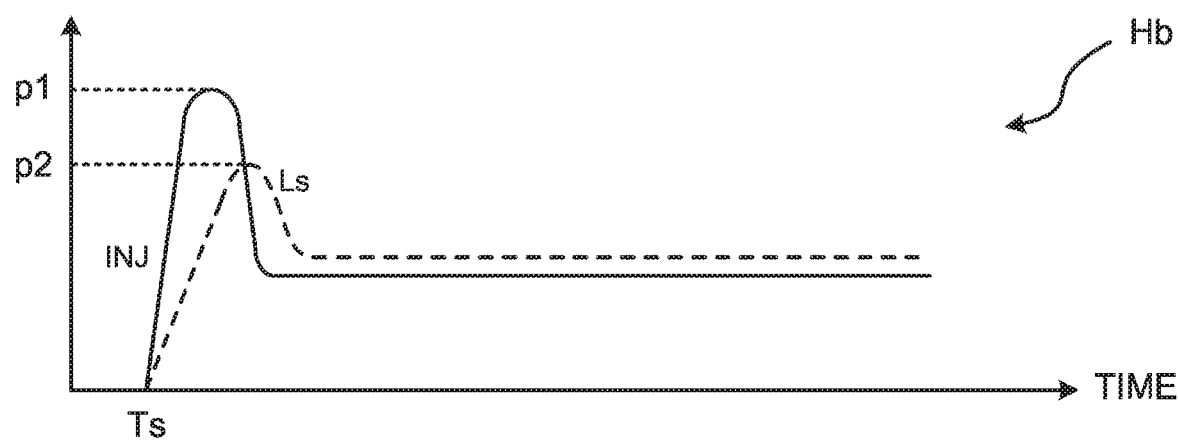

FIG. 5 is a diagram showing a result of performance comparison between the injector and the linear solenoid valve. A solid line indicates the performance of the injector (the INJ 31), and a dotted line indicates the performance of the linear solenoid valve (the auxiliary LS 32 and the bypass LS 33). The injector is an electromagnetic valve, for example, and the valve is opened or closed by an electric on-off control (the opening degree is 100% or 0%). Unlike the injector, the linear solenoid valve allows flow rate adjustment, and therefore the opening degree can be electrically controlled to an arbitrary opening degree (0% to 100%).

Reference character Ha denotes an exemplary change in the anode gas flow rate with respect to time. Time Ts is a timing when the ECU 70 gives the instruction of the injection to the injector and the linear solenoid valve. A time necessary for the flow rate of the injector to reach a peak flow rate Vp from the instruction time Ts is shorter than a time necessary for the flow rate of the linear solenoid valve to reach the peak flow rate Vp from the instruction time Ts. That is, the responsiveness of the injector is higher than that of the linear solenoid valve.

Reference character Hb denotes an exemplary change in a pressure difference Δp between an upstream side and a downstream side of a water droplet fit in the flow passage with respect to time in the case of the injection of the injector and the linear solenoid valve. Because of the above difference in responsiveness, a time necessary for the pressure difference Δp in the injector to reach a maximum value p1 is shorter than a time necessary for the pressure difference Δp in the linear solenoid valve to reach a maximum value p2. Further, the maximum value p1 of the pressure difference Δp at the time of the injection of the injector is larger than the maximum value p2 of the pressure difference Δp at the time of the injection of the linear solenoid valve. Therefore, when the ECU 70 executes the injection of the INJ 31, the liquid water is more effectively discharged than when the ECU 70 executes the injection of the auxiliary LS 32 and the bypass LS 33.

Back to FIG. 4, the ECU 70 stops the injection of the auxiliary LS 32 and the bypass LS 33 in the normal operation after the completion of the warm-up operation. This restrains the consumption of the anode gas that is generated by the injection of the auxiliary LS 32 and the bypass LS 33. For example, in the case where it is predicted that the amount of the anode gas is insufficient because the required current value of the FC 1 is large, the ECU 70 may execute the injection of the auxiliary LS 32 and the bypass LS 33 in the normal operation.

Process by ECU 70

Figure 6:
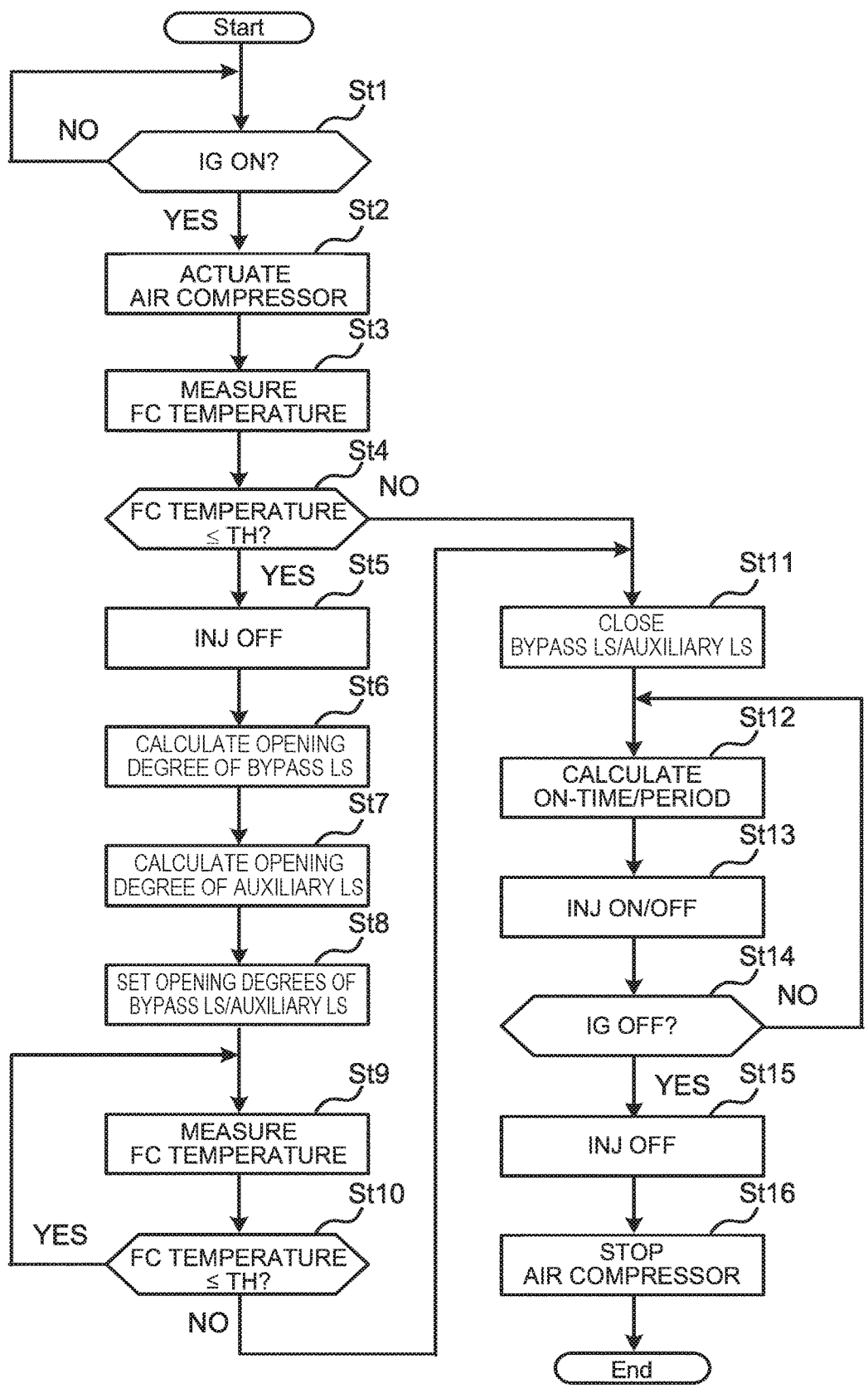
FIG. 6 is a flowchart showing an exemplary process by an electronic control unit (ECU)

FIG. 6 is a flowchart showing an exemplary process by the ECU 70. The process is executed while the ignition switch 71 is in the off-state and the fuel cell system 100 is in the stop state.

The ECU 70 determines whether the ignition switch 71 has been turned on (step St1). In the case where the ignition switch 71 is in the off-state (No in step St1), step St1 is executed again. In the case where the ignition switch 71 has been turned on (Yes in step St1), the ECU 70 actuates the air compressor 20 for the electric power generation of the FC 1 (step St2). Thereby, the cathode gas starts to be supplied from the air compressor 20 to the FC 1.

Next, the ECU 70 measures the temperature of the coolant as the temperature of the FC 1, with the temperature sensor 73 (step St3). In the case where the temperature of the FC 1 is equal to or lower than the reference temperature TH (Yes in step St4), the ECU 70 performs the warm-up operation of the FC 1 (step St5 to step St8). In the case where the temperature of the FC 1 is higher than the reference temperature TH (No in step St4), the ECU 70 performs the normal operation of the FC 1 (step St11 to step St13).

First, the warm-up operation will be described. The ECU 70 turns the INJ 31 off (step St5). Therefore, the supply of the anode gas from the INJ 31 to the FC 1 is not performed.

Next, the ECU 70 calculates the opening degree of the bypass LS 33 based on the temperature of the FC 1 (step St6). Thereby, the ECU 70 decides the flow rate of the anode gas that is injected from the bypass LS 33, depending on the temperature of the FC 1 at the time of the start of the warm-up operation.

Next, the ECU 70 calculates the opening degree of the auxiliary LS 32 based on the opening degree of the bypass LS 33, such that the reverse flow of the anode gas from the bypass LS 33 to the ejector flow passage 44 is restrained (step St7). For example, the ECU 70 calculates the opening degree of the auxiliary LS 32, such that the anode gas is injected at a flow rate that allows the reverse flow of the anode gas to be offset.

Next, the ECU 70 sets the opening degree of the bypass LS 33 and the opening degree of the auxiliary LS 32 (step St8). Thereby, the bypass LS 33 and the auxiliary LS 32 start the injection of the anode gas at flow rates depending on the set opening degrees (step St8). In this way, the ECU 70 executes the injection of the bypass LS 33 at a flow rate depending on the temperature of the FC 1 at the time of the start of the warm-up operation of the FC 1, and therefore can quickly raise the temperature of the FC 1.

Next, the ECU 70 measures the temperature of the FC 1 with the temperature sensor 73 (step St9). In the case where the temperature of the FC 1 is equal to or lower than the reference temperature TH (Yes in step St10), the ECU 70 measures the temperature of the FC 1 again (step St9). In the case where the temperature of the FC 1 is higher than the reference temperature TH (No in step St10), the ECU 70 performs the normal operation of the FC 1 (step St11 to step St13).

Next, the normal operation will be described. The ECU 70 closes the bypass LS 33 and the auxiliary LS 32 (step St11). Thereby, the anode gas injection from the bypass LS 33 and the auxiliary LS 32 is stopped.

Next, the ECU 70 decides the required current value of the FC 1 based on the detection value of the accelerator operation amount sensor 72, for example, and calculates the on-time of the INJ 31 and the period of on-off (Δt and f in FIG. 4) based on the required current value (step St12). Next, the ECU 70 performs the on-off control of the INJ 31 in accordance with the on-time and the period of on-off (step St13). Thereby, the anode gas is supplied to the FC 1, at a flow rate depending on the required current value.

Next, the ECU 70 determines whether the ignition switch 71 has been turned off (step St14). In the case where the ignition switch 71 is in the on-state (No in step St14), step St12 to step St14 are executed again. In the case where the ignition switch 71 has been turned off (Yes in step St14), the ECU 70 turns the INJ 31 off (step St15), and stops the air compressor 20 (step St16). Thereby, the electric power generation of the FC 1 is stopped.

Another Fuel Cell System

In the above-described fuel cell system 100, the ejector 4 includes the large-diameter nozzle 41 and the small-diameter nozzle 42 that are separately provided and that are connected to the INJ 31 and the auxiliary LS 32 respectively. That is, the ejector 4 includes the large-diameter nozzle 41 from which the anode gas injected from the INJ 31 is injected to the ejector flow passage 44, and the small-diameter nozzle 42 from which the anode gas injected from the auxiliary LS 32 is injected to the ejector flow passage 44. Therefore, it is possible to adopt appropriately different injection amounts, as the injection amount of the large-diameter nozzle 41 and the injection amount of the small-diameter nozzle 42. However, without being limited to this, the INJ 31 and the auxiliary LS 32 may be connected to a common nozzle.

Figure 7:
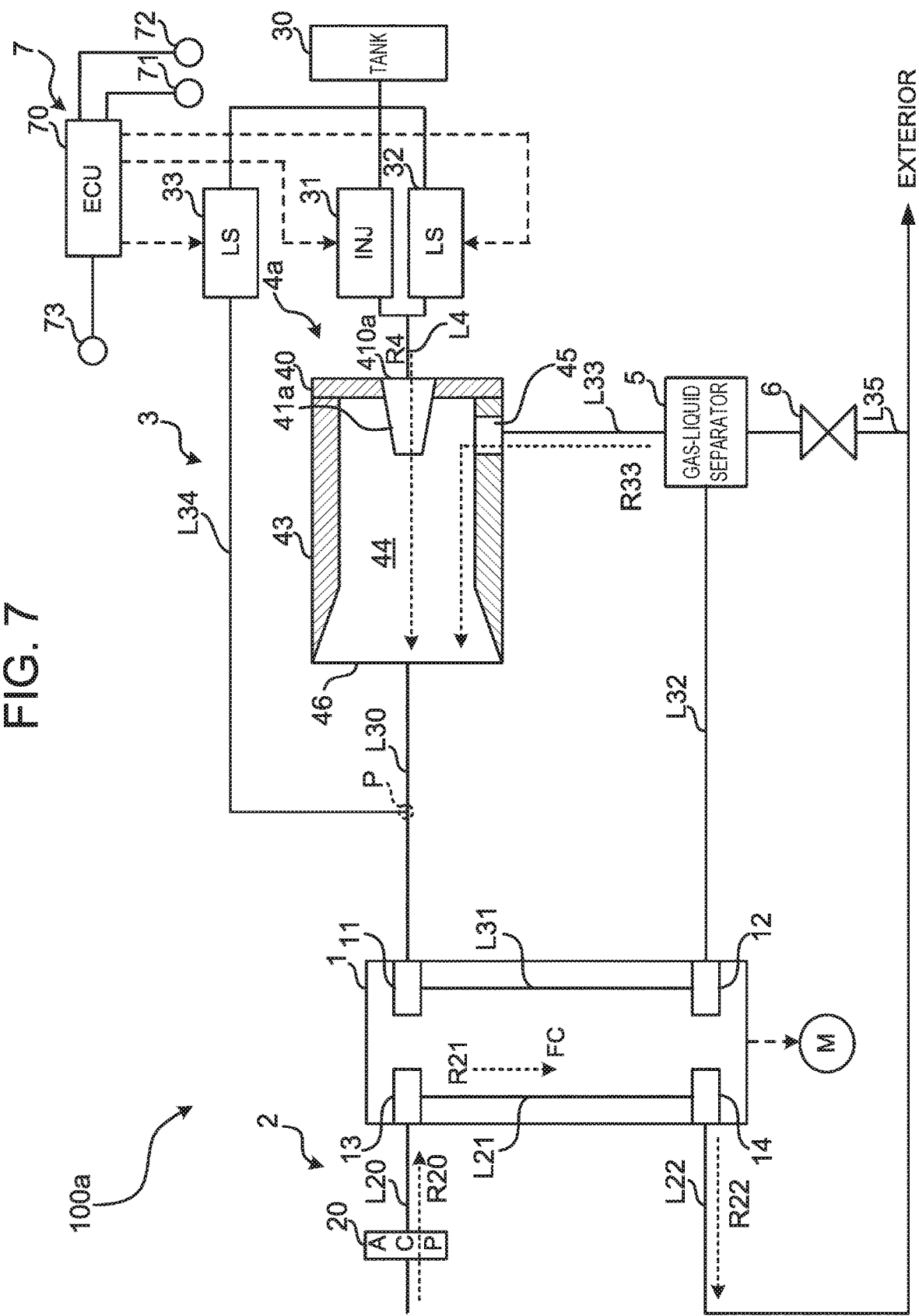
FIG. 7 is a configuration diagram showing another exemplary fuel cell system.

FIG. 7 is a configuration diagram showing another exemplary fuel cell system 100a. In FIG. 7, constituents in common with FIG. 2 are denoted by identical reference characters, and descriptions for the constituents are omitted.

The fuel cell system 100a includes an ejector 4a including a single nozzle 41a, instead of the ejector 4. The INJ 31 and the auxiliary LS 32 are connected to an inlet port 410a of the nozzle 41a through a bifurcated connecting pipe L4. Therefore, the anode gas injected from the INJ 31 or the auxiliary LS 32 flows from the nozzle 41a to the ejector flow passage 44, as shown by an arrow R4. The nozzle 41a is an exemplary third nozzle.

In this way, the ejector 4a includes the common nozzle 41a from which the anode gas injected from the INJ 31 and the anode gas injected from the auxiliary LS 32 are injected to the ejector flow passage 44. Therefore, the size of the ejector 4a is smaller than the size of the ejector 4 including the large-diameter nozzle 41 and the small-diameter nozzle 42.

Fuel Cell System in Comparative Example

Figure 8:
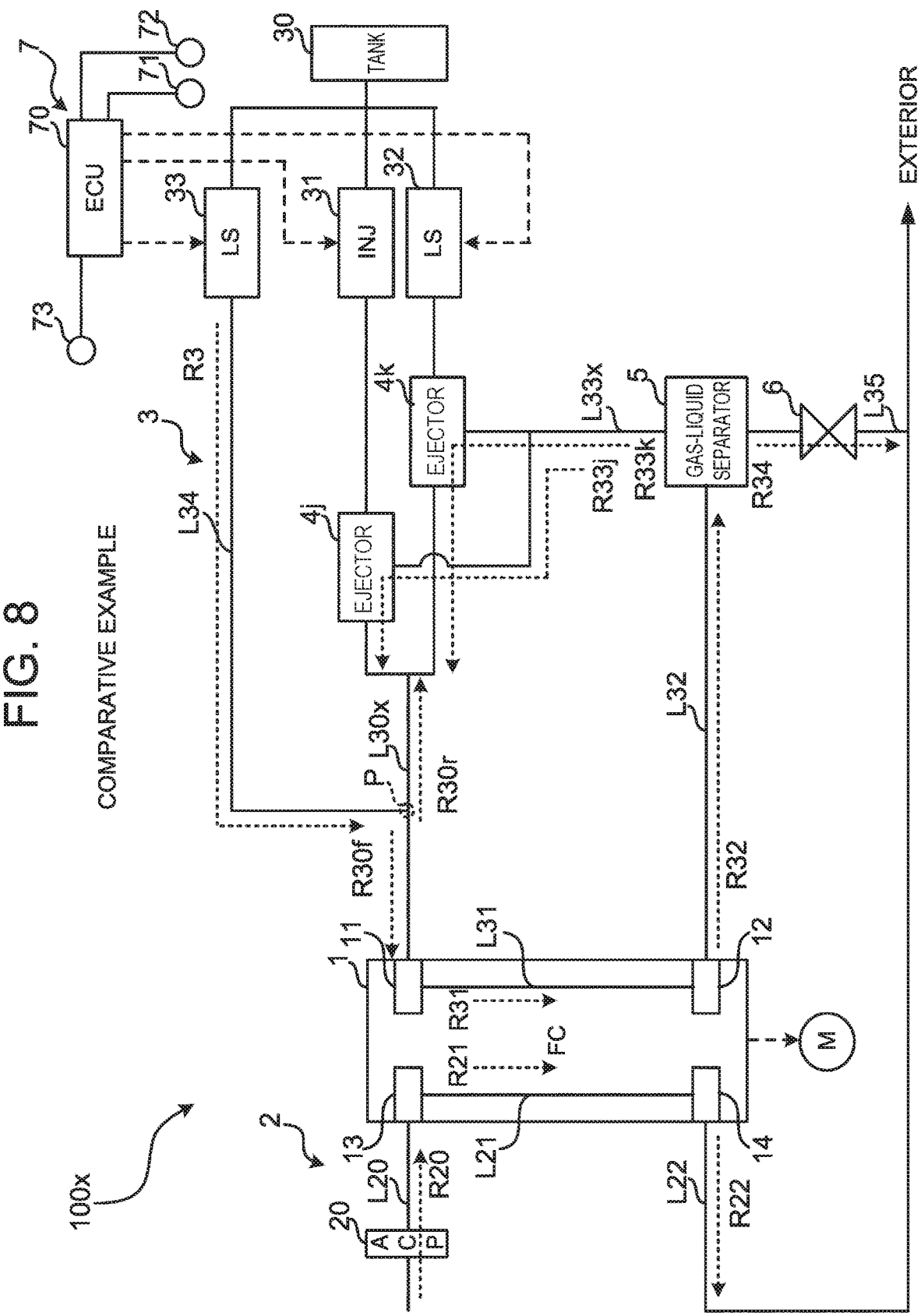
FIG. 8 is a configuration diagram showing a fuel cell system in a comparative example.

FIG. 8 is a configuration diagram showing a fuel cell system 100x in a comparative example. In FIG. 8, constituents in common with FIG. 1 are denoted by identical reference characters, and descriptions for the constituents are omitted.

The fuel cell system 100x includes ejectors 4j, 4k connected to the INJ 31 and the auxiliary LS 32 respectively, instead of the ejector 4. Each of the ejectors 4j, 4k has the same structure as the ejector 4a shown in FIG. 7.

Outflow ports 46 of the ejectors 4j, 4k are connected to the inlet port 11 of the FC 1 through a bifurcated anode supply pipe L30x. Further, inflow ports 45 of the ejectors 4j, 4k are connected to the gas-liquid separator 5 through a bifurcated return pipe L33x.

When the INJ 31 injects the anode gas, the anode off gas flows through the return pipe L33x from the gas-liquid separator 5, and is sucked from the inflow port 45 into the ejector 4j, as shown by an arrow R33j. The anode gas injected from the INJ 31 flows through the ejector flow passage 44, and is ejected from the outflow port 46 to the anode supply pipe L30x, together with the anode off gas sucked from the inflow port 45.

When the auxiliary LS 32 and the INJ 31 inject the anode gas, the anode off gas flows through the return pipe L33x from the gas-liquid separator 5, and is sucked from the inflow port 45 into the ejector 4k, as shown by an arrow R33k. The anode gas injected from the INJ 31 flows through the ejector flow passage 44, and is ejected from the outflow port 46 to the anode supply pipe L30x, together with the anode off gas sucked from the inflow port 45.

The ECU 70 performs the warm-up operation of the FC 1, by continuously executing the injection of the bypass LS 33 and the auxiliary LS 32. On this occasion, the anode gas injected from the bypass LS 33 reversely flows to the ejectors 4j, 4k as shown by an arrow R30r.

The ECU 70 executes the injection of the auxiliary LS 32 such that the reverse flow of the anode gas is restrained.

Thereby, the anode gas injected from the bypass LS 33 flows to the inlet port 11 of the FC 1 as shown by an arrow R30f.

On this occasion, the anode off gas flows from the inflow port 45 into the ejector 4k. Therefore, when the ECU 70 stops the injection of the auxiliary LS 32 at the time of the completion of the warm-up operation, the liquid water contained in the anode off gas remains in the ejector flow passage 44 of the ejector 4k.

After the completion of the warm-up operation, the ECU 70 performs the normal operation of the FC 1 by intermittently executing the injection of the INJ 31. On this occasion, the anode off gas flows from the inflow port 45 into the ejector 4j, and the liquid water is generated in the ejector flow passage 44. However, since the injection of the INJ 31 is intermittently executed, the pressure of the anode gas pulsates, and the liquid water in the ejector flow passage 44 is easily discharged from the outflow port 46.

In the comparative example, the ejector 4j connected to the INJ 31 and the ejector 4k connected to the auxiliary LS 32 are separately provided. Therefore, the liquid water remains in the ejector 4k after the stop of the injection of the auxiliary LS 32. Even if the injection of the auxiliary LS 32 is continued in the normal operation, the injection is continuously performed. Therefore, the pressure of the anode gas does not pulsate, unlike the INJ 31. Therefore, it is hard to discharge the liquid water in the ejector 4k.

In response, the above-described fuel cell systems 100, 100a are provided with the common ejectors 4, 4a connected to the INJ 31 and the auxiliary LS 32. Although the ECU 70 continuously executes the injection of the auxiliary LS 32 during the warm-up operation, the ECU 70 intermittently executes the injection of the INJ 31 after the warm-up operation. Therefore, unlike the comparative example, the liquid water in the ejectors 4, 4a is easily discharged by the pulsation of the pressure of the anode gas due to the injection of the INJ 31.

As described above, the ECU 70 performs the warm-up operation of the FC 1 by executing the injection of the bypass LS 33, and executes the injection of the auxiliary LS 32 such that the reserve flow of the anode gas from the bypass LS 33 to the ejectors 4, 4a is restrained. Since the auxiliary LS 32 and the bypass LS 33 continuously inject the anode gas, the reverse flow of the anode gas to the ejectors 4, 4a is restrained. Further, it is possible to perform the warm-up operation, while continuously supplying the anode gas that does not contain the impurity gas in the ejectors 4, 4a and that has a high concentration, from the bypass LS 33 to the FC 1.

Further, the ECU 70 executes the injection of the INJ 31 after the completion of the warm-up operation of the FC 1. The INJ 31 intermittently injects the anode gas, and the FC 1 uses the anode gas for the electric power generation. Therefore, the pressure in the ejectors 4, 4a pulsate due to the intermittent injection of the INJ 31.

Further, the ejectors 4, 4a include the common ejector flow passage 44 through which the anode off gas discharged from the outlet port 12 of the FC 1 and the anode gas injected from the INJ 31 and the auxiliary LS 32 flow to the outflow port 46. Therefore, the liquid water generated in the ejector flow passage 44 by the injection of the auxiliary LS 32 is discharged from the outflow port 46 by the pulsation of the pressure due to the intermittent injection of the INJ 31.

Accordingly, the fuel cell systems 100, 100a in the embodiment can easily discharge the liquid water that remains in the ejectors 4, 4a after the warm-up operation of the FC 1.

The above-described embodiment is an exemplary preferred embodiment of the disclosure. The disclosure is not limited to this embodiment, and various modifications can be made without departing from the spirit of the disclosure.

What is claimed is:

1. A fuel cell system comprising:
a fuel cell that includes an installation port and a discharge port for a reactant gas that is used for electric power generation;
a first injection device that injects the reactant gas;
a second injection device and a third injection device that inject the reactant gas;
an ejector that includes an ejection port from which the reactant gas discharged from the discharge port is ejected together with the reactant gas injected from the first injection device or the second injection device;
a first flow passage that connects the installation port and the ejection port;
a second flow passage through which the reactant gas injected from the third injection device is led to the first flow passage without the ejector; and
a control device configured to control an injection of the first injection device, the second injection device and the third injection device, wherein:
the ejector includes a common third flow passage through which the reactant gas discharged from the discharge port and the reactant gas injected from the first injection device and the second injection device flow to the ejection port; and
the control device is configured to execute the following processes in an order of (i) to (iv):
(i) stopping an injection of the first injection device,
(ii) executing an injection of the third injection device to continuously inject the reactant gas for performing a warm-up operation of the fuel cell, and executing an injection of the second injection device to continuously inject the reactant gas for restraining a reverse flow of the reactant gas, the reverse flow being a reverse flow by which the reactant gas flows from the third injection device to the third flow passage through the second flow passage, the first flow passage and the ejection port,
(iii) stopping the injection of the second injection device and the injection of the third injection device, and
(iv) executing the injection of the first injection device to intermittently inject the reactant gas.

2. The fuel cell system according to claim 1, wherein the control device is configured to execute the injection of the second injection device at a flow rate depending on a temperature of the fuel cell at a time of start of the warm-up operation of the fuel cell.

3. The fuel cell system according to claim 1, wherein the ejector includes a first nozzle from which the reactant gas injected from the first injection device is injected to the third flow passage, and a second nozzle from which the reactant gas injected from the second injection device is injected to the third flow passage.

4. The fuel cell system according to claim 1, wherein the ejector includes a common third nozzle from which the reactant gas injected from the first injection device and the reactant gas injected from the second injection device are injected to the third flow passage.

5. The fuel cell system according to claim 1, wherein the control device is configured to perform the warm-up operation of the fuel cell until a temperature of the fuel cell exceeds a freezing point.

6. The fuel cell system according to claim 1, wherein:
the first injection device includes an injector; and
each of the second injection device and the third injection device includes a linear solenoid valve.

* * * * *